(12) United States Patent
Schweiger et al.

(10) Patent No.: US 12,472,039 B2
(45) Date of Patent: Nov. 18, 2025

(54) METHOD AND SYSTEM FOR THE DIGITAL ACQUISITION OF INTRAORAL STRUCTURE AND COLOR CORRECTION BASED ON DISTANCE BETWEEN REFERENCE TEMPLATE VALUE AND SCANNED VALUE

(71) Applicant: Ivoclar Vivadent AG, Schaan (LI)

(72) Inventors: Josef Schweiger, Bergen (DE); Jan-Frederik Güth, Munich (DE)

(73) Assignee: Ivoclar Vivadent AG, Schaan (LI)

( * ) Notice: Subject to any disclaimer, the term of this patent is extended or adjusted under 35 U.S.C. 154(b) by 393 days.

(21) Appl. No.: 18/002,739

(22) PCT Filed: Jun. 25, 2021

(86) PCT No.: PCT/EP2021/067560
§ 371 (c)(1),
(2) Date: Dec. 21, 2022

(87) PCT Pub. No.: WO2021/260199
PCT Pub. Date: Dec. 30, 2021

(65) Prior Publication Data
US 2023/0240817 A1 Aug. 3, 2023

(30) Foreign Application Priority Data

Jun. 26, 2020 (DE) ...................... 10 2020 003 856.5

(51) Int. Cl.
*A61C 9/00* (2006.01)
*A61B 1/00* (2006.01)
(Continued)

(52) U.S. Cl.
CPC ........ *A61C 9/0053* (2013.01); *A61B 1/00194* (2022.02); *A61B 1/24* (2013.01);
(Continued)

(58) Field of Classification Search
CPC ... A61B 1/00009; A61B 1/00194; A61B 1/24; A61B 5/0062; A61B 5/008;
(Continued)

(56) References Cited

U.S. PATENT DOCUMENTS

| | | | |
|---|---|---|---|
| 11,598,632 B2 * | 3/2023 | Pesach | ................ A61B 5/1076 |
| 2008/0094631 A1 | 4/2008 | Jung et al. | |
| 2017/0252135 A2 | 9/2017 | Reay et al. | |

FOREIGN PATENT DOCUMENTS

| | | |
|---|---|---|
| CN | 111136915 A | 5/2020 |
| WO | 2019/220212 A2 | 11/2019 |

OTHER PUBLICATIONS

Brandt, Jan, et al. "In vivo study for tooth colour determination—visual versus digital." Clinical oral investigations 21, pp. 2863-2871 (Year: 2017).*

(Continued)

*Primary Examiner* — Scott A Rogers
(74) *Attorney, Agent, or Firm* — Ann M. Knab; Thad McMurray

(57) ABSTRACT

The invention relates to a method for the digital acquisition of an intraoral structure by scanning the structure using an intraoral color scanner which, according to the invention, is designed to correct color values of the scanning points using a color reference template of a reference color space.

14 Claims, 2 Drawing Sheets

(51) Int. Cl.
 *A61B 1/24*   (2006.01)
 *A61B 5/00*   (2006.01)
 *A61C 13/00*   (2006.01)
 *A61C 13/08*   (2006.01)
 *G01J 3/50*   (2006.01)

(52) U.S. Cl.
 CPC ........ *A61B 5/0088* (2013.01); *A61C 13/0019* (2013.01); *A61C 13/082* (2013.01); *G01J 3/508* (2013.01)

(58) Field of Classification Search
 CPC .............. A61B 5/0088; A61B 2576/00; A61B 2576/02; A61C 9/0053; A61C 13/0019; A61C 13/082; H04N 1/6005; H04N 1/6027; G01J 3/508
 See application file for complete search history.

(56) References Cited

OTHER PUBLICATIONS

Eggmann, F., and M. B. Blatz. "Recent advances in intraoral scanners." Journal of Dental Research 103.13, pp. 1349-1357 (Year: 2024).*

Hein, Sascha, et al. "Comparative evaluation of intraoral scanners and a spectrophotometer for percent correct shade identification in clinical dentistry." Clinical oral investigations 29.1, pp. 1-8 (Year: 2025).*

Huang, Mingming, et al. "Evaluation of accuracy and characteristics of tooth-color matching by intraoral scanners based on Munsell color system: an in vivo study." Odontology 110.4. pp. 759-768 (Year: 2022).*

Jingqin, L., et al., A Color Distance Model Based on Visual Recognition, Mathematical Problems in Engineering, May 20, 2018, vol. 2018, pp. 1-7.

* cited by examiner

METHOD AND SYSTEM FOR THE DIGITAL ACQUISITION OF INTRAORAL STRUCTURE AND COLOR CORRECTION BASED ON DISTANCE BETWEEN REFERENCE TEMPLATE VALUE AND SCANNED VALUE

CROSS-REFERENCE TO RELATED APPLICATIONS

This application is a National Stage application of International patent application PCT/EP2021/067560 filed on Jun. 25, 2021, which claims priority to German patent application No. 102020003856.5 filed on Jun. 26, 2020, the disclosures of which are incorporated herein by reference in their entirety.

FIELD OF THE INVENTION

The invention relates to a method for digitally detecting an intraoral structure by scanning the structure with an intraoral scanner, the scanned values of which contain location information data representing the spatial position of the scanning points and color information data representing color values of the scanning points, as well as to a color reference template and a system for carrying out the method.

The invention aims at a digital three-dimensional intraoral detection of teeth, gingiva or jaw areas with geometry-related color information.

BACKGROUND

The digital detection of intraoral structures by means of digital 3D scans has been available in the dental field for 33 years now. Until a few years ago, intraoral scanning was limited to measuring and determining the geometric data of the surfaces, which is represented by the location information data contained in the scanned values of an intraoral scanner. For some years now, there have also been scanner suppliers which, in addition to the actual surface information, also detect and output the color information. The special feature is that the color information is geometry-related. This means that a defined color is assigned to each position on the surface data set. There are various file formats that can display both types of information (geometry, geometry-related color), such as PLY, OBJ, VRML, etc.

Currently, there is no way to display the geometry-related color information of the intraoral scan without color errors. The devices of the different manufacturers therefore output the color very differently. The value of the color information for subsequent processing steps is therefore correspondingly low or the color information is even worthless.

SUMMARY

The invention is based on the task of further developing a method of the type mentioned above so that color errors of scanned intraoral structures can be corrected, and of specifying a color reference template suitable for carrying out the method and a system suitable for carrying out the method.

BRIEF DESCRIPTION OF THE DRAWINGS

Further details, advantages and features will be apparent from the following description of several exemplary embodiments of the invention with reference to the drawings, in which.

DETAILED DESCRIPTION

According to the invention, this task is solved with respect to the method by arranging, in the scanning area of the structure, a color reference template having a reference color field corresponding to a reference color value of a reference color space, and by correcting the scanned color information data according to the distance between the reference color value and a scanned color value of the reference color field.

In particular, the following steps are taken:

Before starting the three-dimensional intraoral scan, the scanner is calibrated as specified by the manufacturer. Subsequently, before intraoral scanning of the intraoral structure, in particular the gingiva and the teeth, the reference template, which is designed as a "gray card point", for example, is applied to the gingiva. The point has, for example, a gray color that has exactly the color value of a gray card used in photography for color calibration. This "gray card point" can be designed in various geometric shapes, such as a flat two-dimensional disc, a three-dimensionally shaped hemisphere, etc. The point can be offered as a customized product, wherein the surface facing the gingiva can be provided with an adhesive so that the "gray card point" can be glued onto the gingiva or teeth.

After adhesive bonding of the "gray card point", the jaws (teeth and gingiva) are scanned with the 3D intraoral scanner. This image is called a "reference image". The scanner used must offer the possibility of detecting the geometry-related color in addition to the three-dimensional surface. In scanning, in addition to the teeth and the gingiva, the "gray card point" is also scanned. This means that the standardized color information of the gray card is mapped in the geometry-related color information of the 3D intraoral scan. Furthermore, more than 1 color reference point can be bonded adhesively onto the gingiva or teeth, for example one point in the anterior tooth region and one point in each quadrant of the posterior tooth region. In this way, different external exposure influences, e.g. due to ambient light (room lights, lights on the dentist's chair, daylight, etc.), can be compensated for in the posterior and anterior tooth regions. The subsequent color corrections can be made segment by segment accordingly.

Figure 1:
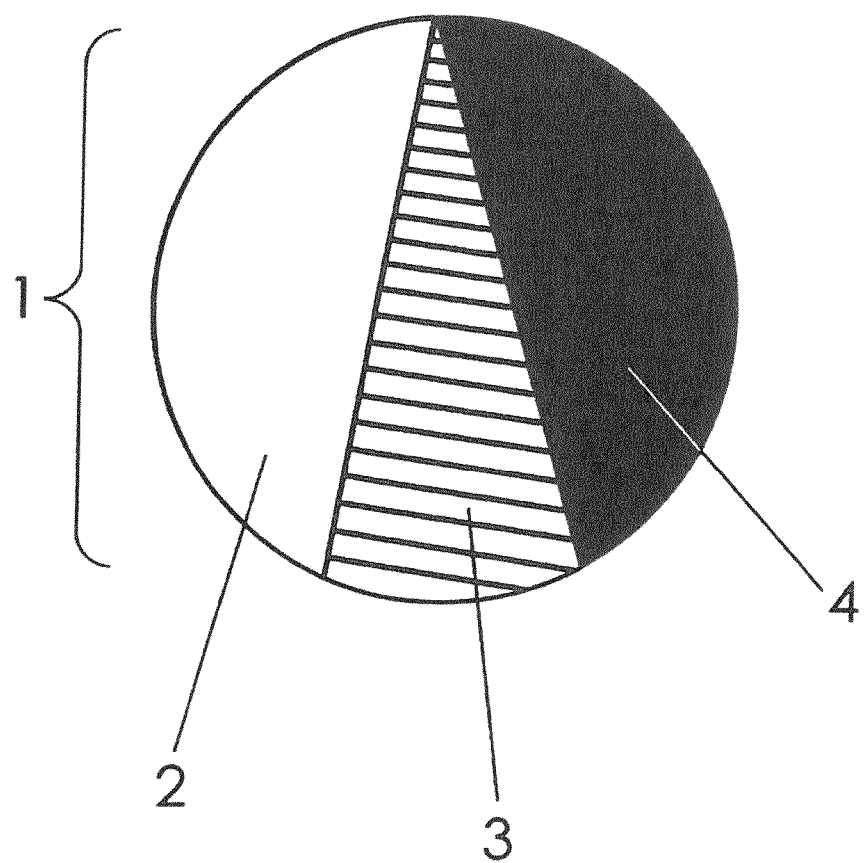
FIG. 1 shows a multicolor point in accordance with the invention.
Figure 2:
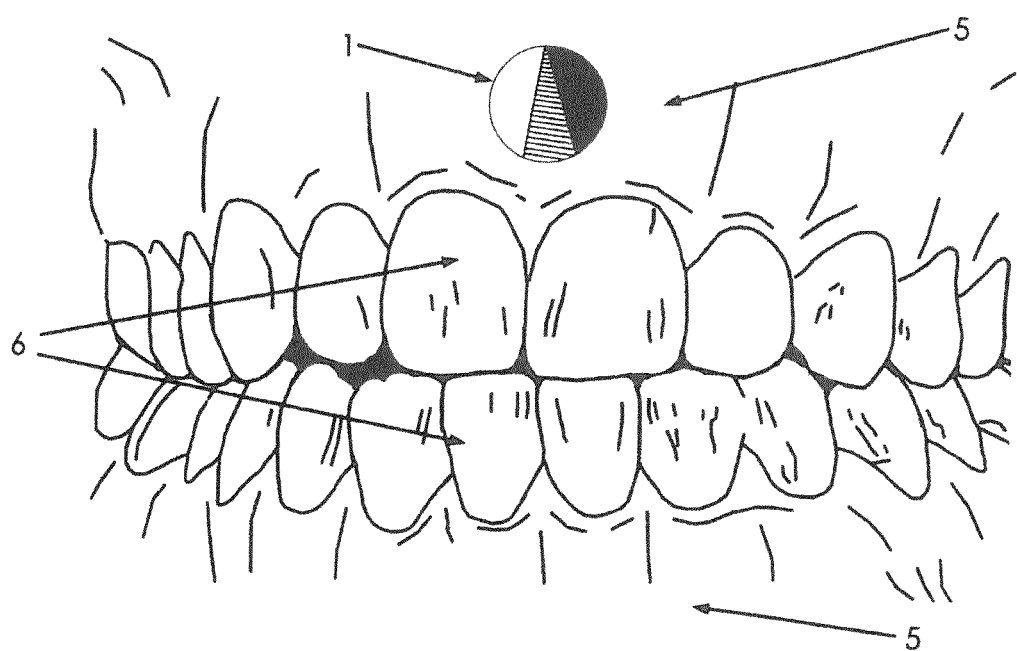
FIG. 2 shows the initial intraoral situation with gingiva and tooth rows, in which this gray card point is adhesively bonded to the gingiva.

Optionally, instead of the "gray card point" comprising the reference color field a "multicolor point" can be used. This point contains at least one color and can contain an unlimited number of colors, each of which is precisely defined. In a special embodiment shown in FIG. 1, point (1) contains the color gray (3) (like the gray card point), the color white (2) and the color black (4). This "multicolor point", too, can be designed three-dimensionally, e.g. as a hemisphere, tetrahedron, pyramid etc. The additional colors white and black can optionally be used to calibrate the color images more precisely. FIG. 2 shows the initial intraoral situation with gingiva (5) and tooth rows (6), in which this gray card point is adhesively bonded to the gingiva.

Using software, it is possible to separate the color information data and the 3D surface information represented by the location information data. The result is a two-dimensional image of the color information and the 3D data set of the scanned jaw with teeth and gingiva. In addition, there is another file which assigns the two-dimensional pixel-bypixel color information to a three-dimensional point on the scanned 3D surface data set (="mapping file").

Since the two-dimensional color information also maps the information of the "gray card point"/"multicolor point", it is possible to correct the reference image using the standardized gray value/black value/white value. For this purpose, the Adobe Photoshop or Adobe Lightroom software can be used, for example. After this step, the geometry-related color information is also corrected so that the final result is a color-correct 3D intraoral color scan.

The total data set is formed from two individual data sets. The assignment of the color information to the 3D surface data set is done by means of a so-called "mapping file". The color correction of the data set of the color information from the intraoral 3D scan can be performed using common image processing programs, such as Adobe Photoshop. For example, color correction is performed using tonal correction and gray card point.

The color-corrected image is copied back into the total data set of the intraoral 3D scan, replacing the previous image. Now the "mapping file" reassigns the corrected color values to the 3D points of the surface scan without changing the orientation. The color correction of the geometry-related color information is thus finalized.

Subsequently, the corrected data set can be used for the production, in particular additive manufacturing, e.g. by means of multi-material 3D printing, of a physical color model or dental restorations such as crowns, bridges or prosthesis.

In addition to additive manufacturing, manufacturing processes such as milling, pressing, casting or deep drawing can also be used for further processing of the corrected data sets. For example, the color can be applied to a ceramic restoration subtractively produced using CAD/CAM technology in a subsequent step by means of a print head. A corresponding technology is described in the patent specification DE 10 2006 061 893 B3.

The further processing of the corrected data set is carried out in particular with a software referred to as model builder software. By means of additive processes, a realistic and color-true 3D model of the jaw situation is additively produced from the processed data using multi-material 3D printing, said 3D model being a master model with geometry-related color information (graphic 3D model).

The detection of the scanned color information of the reference color field, in particular the gray card point/multicolor point in the three-dimensional scanned data set or in the output two-dimensional image, can also be performed semi-automatically or fully automatically in addition to manual detection by the user (in the 3D scanned data set or in the two-dimensional image). When detecting the color information, it is necessary to distinguish between the flat two-dimensional gray card point/multicolor point and the three-dimensionally shaped gray card point/multicolor point.

Automatic Detection of the Two-Dimensionally Shaped Gray Card Point/Multicolor Point According to the invention, various color models can be used, such as RGB, CMYK, L*a*b*, CIE Lab and others. In these color models, numerical values are assigned to the individual colors of the color models, for example in the RGB color model to the colors red, green and blue. The numerical values of the colors can have values between 0 and 1 in the classic representation. In the computer-oriented application, integers between 0 and 255 are stored. The RGB color space is shown here as an example:

The color white is assigned the values R 255, G 255, B 255, the color black is assigned the values R 0, G 0, B 0 and the standard gray card (18% gray) is assigned the values R 128, G 128, B 128.

Instead of 8-bit unsigned integers, some modern computer-oriented applications and interfaces frequently use floating-point numbers internally which represent a larger range of values with higher resolution.

In order to perform an analog detection of the gray card point/multicolor point, it is absolutely necessary to have a two-dimensional image of the color information. However, the data of different 3D intraoral scanners shows a different representation of these color points, so that they are poorly detectable or not detectable at all in an analog manner. In addition, it is also possible that the color information is present as a pure numerical code in the corresponding scanned data set, so that detection by the user is also difficult or even impossible here. Therefore, it is useful to use an automated algorithm to detect the gray card point/multicolor point. The present invention addresses this deficiency as follows:

The detected numerical values of the color information form an n-dimensional space (e.g. three-dimensional color space for RGB color model). The color values of the gray card point/multicolor point have a defined position/fixed value in this color space. With the help of the inventive calculation algorithm, all detected color values of the scanning points are compared with the defined color values of the reference color field and the color values that are most similar to the defined color values are selected. This smallest distance is calculated according to the principle of the "Euclidean distance".

The distance of a measured color value (p) in the n-dimensional color space to the reference color value of the gray card point/multicolor point (q) is calculated as follows:

$$d(p, q) = \|q - p\|_2 = \sqrt{(q_1 - p_1)^2 + \ldots + (q_n - p_n)^2} = \sqrt{\sum_{i=1}^{n}(q_i - p_i)^2}$$

The following values of the gray card point/multicolor point (q) are applied in the three-dimensional RGB color space, for example:
White (R255,G255,B255)
Black (R0,G0,B0)
18% Gray (R128,G218,B218)

By defining a maximum value (threshold value) for the distance of the measured color value (p) in the n-dimensional color space to the reference color value of the gray card point/multicolor point (q), the number of determined measured values can be controlled individually.

For all detected distances of the gray card point/multicolor point on a pixel-by-pixel basis, an average/median value is obtained, which is then used as a correction value for all measured color values.

Automatic Detection of the Three-Dimensionally Shaped Gray Card Point/Multicolor Point The three-dimensionally shaped gray card point/multicolor point can be detected in the 3D scanning data set by comparing the geometry of the three-dimensionally shaped gray card point/multicolor point (for example, hemisphere, tetrahedron, pyramid, etc.) (nominal value) stored in the software with the 3D scanning data set (actual value). The so-called "best-fit method" is used as the calculation algorithm. To determine the position of the three-dimensionally shaped gray card point/multicolor point, the standard deviation stddev is formed by iterative processes by means of the smallest distance:

$$stddev = \sqrt{\frac{\sum_{i,j}^{n}\left[(x_{1i}-x_{2j})^2 + (y_{1i}-y_{2j})^2 + (z_{1i}-z_{2j})^2\right]}{n}}$$

After the detection of the three-dimensionally shaped gray card point/multicolor point in the scanned 3D data set, the color values assigned to the three-dimensional point values can be selected and the distance of these colorimetric values (p) of the n-dimensional color space to the reference color value of the gray card point/multicolor point (q) can be calculated according to the procedures described above.

LIST OF REFERENCE SIGNS

1 Multicolor point
2 Color white
3 Color gray
4 Color black
5 Gingiva
6 Tooth rows

The invention claimed is:

1. A method for digitally detecting an intraoral structure by scanning the structure with an intraoral scanner, the scanned values of which contain location information data representing the spatial position of the scanning points and color information data representing color values of the scanning points,
wherein at least one color reference template having a reference color field corresponding to a reference color value of a reference color space is arranged in the scanning area of the structure, and
wherein the scanned color information data is corrected according to the distance between the reference color value and a scanned color value of the reference color field.

2. The method according to claim 1,
wherein the reference color field of the color reference template comprises a gray field.

3. The method according to claim 1,
wherein the reference color field of the color reference template comprises a chromatic field.

4. The method according to claim 1,
wherein the corrected scanned values are used for the production of a physical color model or a dental restoration comprising a crown, bridge or prosthesis.

5. The method according to claim 4,
wherein the production is carried out additively by means of multi-material 3D printing.

6. The method according to claim 4,
wherein the production is carried out subtractively by milling, pressing, casting or deep drawing.

7. The method according to claim 1,
wherein at least one scanned color value of the color reference field is selected from the set of scanned color values of the scanning points by a software-implemented algorithm,
wherein location information data of the reference color field is determined by the algorithm from the set of the scanned location information data in a best-fit method and the distance relevant for the correction is determined on the basis of the color values assigned to the determined location information data.

8. The method according to claim 1,
wherein at least one scanned color value of the color reference field is selected from the set of scanned color values of the scanning points by a software-implemented algorithm,
wherein location information data of the reference color field is determined from the set of scanned location information data by an image segmentation algorithm and the distance relevant for the correction is determined on the basis of the color values assigned to the determined location information data.

9. A color reference template for performing the method of claim 1,
wherein a substrate which is adhesively attachable to an intraoral scanning area of the structure on one side surface has the reference color field on a side surface opposite thereto.

10. The color reference template according to claim 9,
wherein the substrate has a basic geometric shape comprising a circular disk shape or a hemispherical shape.

11. A system for carrying out the method according to claim 1,
comprising an intraoral scanner, the scanned values of which contain location information data representing the spatial position of the scanning points and color information data representing color values of the scanning points,
a color reference template having a reference color field corresponding to a reference color value of a reference color space, and
means for correcting the scanned color information data according to the distance between the reference color value and a scanned color value of the reference color field.

12. The system according to claim 11,
comprising a multi-material 3D printer controlled by the corrected scanned values.

13. A method for digitally detecting an intraoral structure by scanning the structure with an intraoral scanner, the scanned values of which contain location information data representing the spatial position of the scanning points and color information data representing color values of the scanning points,
wherein at least one color reference template having a reference color field corresponding to a reference color value of a reference color space is arranged in the scanning area of the structure,
wherein the scanned color information data is corrected according to the distance between the reference color value and a scanned color value of the reference color field,
wherein at least one scanned color value of the color reference field is selected from the set of scanned color values of the scanning points by a software-implemented algorithm, and
wherein Euclidean distances between the scanned color values of the scanning points and the reference color value of the reference color field are calculated by the algorithm and the distance relevant for the correction is determined on the basis of a subset of the calculated distances which satisfy a minimum condition.

14. The method according to claim 13, wherein the relevant distance is calculated as the mean value by means of distances of the subset.

* * * * *